J. Maddock.
Horseshoe.
No. 21,571.      Patented Sep. 21, 1858.
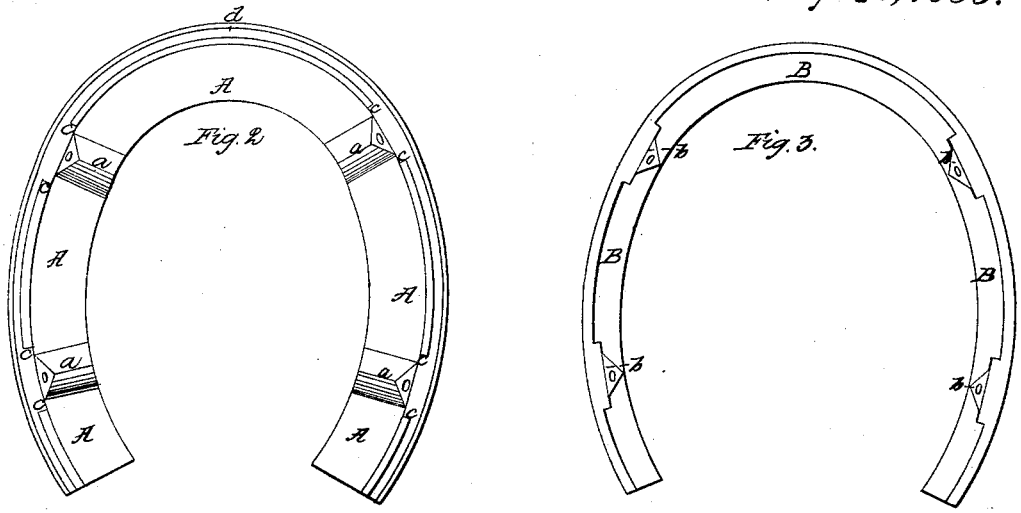
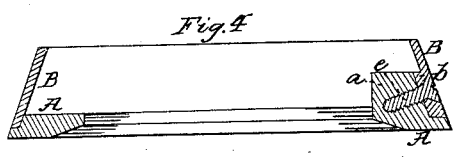
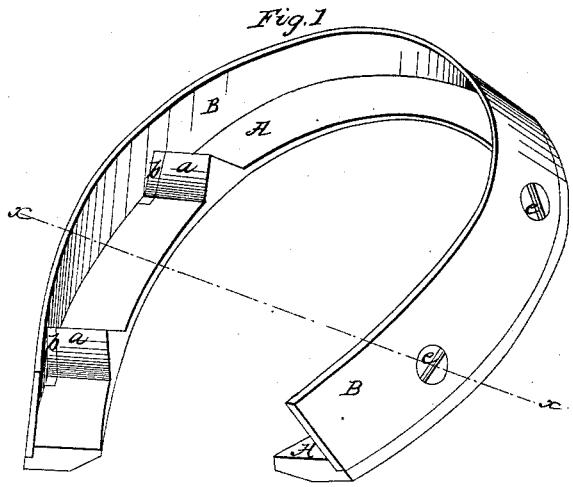

UNITED STATES PATENT OFFICE.

JOHN MADDOCK, OF BLOOMINGTON, ILLINOIS.

IMPROVED HORSESHOE.

Specification forming part of Letters Patent No. 21,571, dated September 21, 1858.

*To all whom it may concern:*

Be it known that I, JOHN MADDOCK, of Bloomington, in the county of McLean and State of Illinois, have invented a certain new and useful Improvement in the Construction of Horseshoes, of which the following is a full, clear, and exact description, reference being had to the accompanying drawings, in which—

Figure 1 represents a perspective view of a horseshoe constructed on my improved plan; Fig. 2, a plan of the sole of the shoe; Fig. 3, a bottom view of the upper flange, and Fig. 4 a vertical section taken through the line $x$ $x$ of Fig. 1.

To persons familiar with horses and their management it is well known what care and attention must be exercised in shoeing them, as through the slightest carelessness or incompetency on the part of the blacksmith they may be lamed by the simple driving of a nail in a wrong direction, and which is the frequent origin of diseased hoofs that may cause permanent lameness. While these are troubles and difficulties experienced in cities, where expert workmen generally congregate, how much more sensibly must they be felt in country places, where it is often necessary, in order to find a workman competent to the task, to send the horse a long distance or else confide it to the care of inexperienced workmen, who are not only incompetent to fit the shoe to the hoof, but who lack the requisite skill to drive the nails in the proper direction, so as to secure the shoe without injury to the foot. Hence the necessity of providing a nailless shoe suitable for the purpose, which, from the simplicity of its construction and the ease with which it can be applied to the foot, can be secured to the hoof by any person of ordinary skill at all acquainted with the management of horses. The reason this class of horseshoes, as heretofore constructed, has not come into more general use is to be attributed to the fact that they are entirely too costly and troublesome to make, and that the usual method of securing them requires that they should project in rear of the foot, thereby not only rendering the horse liable to accident by hooking in or becoming entangled between stumps or projecting roots of trees, &c., but also liable to be torn off by the striking of the toe of the hind foot on the projections formed on the rear of the front shoe, thereby dangerously injuring the hoof. Another serious objection arises to the use of these shoes from the mode employed in fastening them in the rear of the foot, as it binds the heel and compresses the frog, which is the fruitful source of many of the diseases to which the hoof is incident.

The nature and object of my present improvement on this class of horseshoes consist in so constructing them as to obviate the last-mentioned objections, and to prevent the rapid wearing out of the fastening-screws by relieving the latter from side pressure or tension, as also to render them more simple and less costly in their construction, thereby rendering them more generally available.

To enable others skilled in the art to make, construct, and use my improvement, I will now proceed to describe it in detail.

In the accompanying drawings the shoe is represented as consisting of two parts—the sole A and the upper flange, B. On the upper side of the sole A, around its outer edge, a depression, $d$, is formed, of sufficient width to serve as a rest for the upper flange, B, which is made to fit in it. The sole A is also provided on its upper side with lugs $a$—in this instance four in number. Between these lugs and the outer edge of the shoe a groove, $c$, is formed for the reception of corresponding projections, $b$, formed on the inner side of the upper flange, B. Through the sides of the upper flange, B, opposite the projections $b$, screw-threads are cut, which are made to extend through said projections and the lugs $a$, for the reception of screws, by means of which the sole and upper flange are to be fastened together.

When a horse is to be shod, cavities corresponding in size and shape to the lugs $a$ are to be first cut in the under side of the hoof, and the sole A then applied to its under side, the lugs $a$ being fitted into the cavities, which done, the upper flange, B, is then adjusted in the sole by making its projections $b$ fit into the grooves $c$, and the whole finally firmly screwed together. The lugs $a$, which are made to take into the corresponding cavities in the under side of the hoof, will counteract any tendency to displacement of the sole of the shoe by working around, and the projections $b$, which are made to fit into the grooves $c$ of the sole, will prevent any lateral vibration of the upper flange and relieve the fastening-screws from any pressure or tension which might otherwise be exerted upon them. Here it may be also remarked that by this method of securing the shoe to the hoof the latter is not exposed, to be cramped together at its hind end, as is the case where the shoe is fastened by means of screws passing through its rear projections.

The sole of the shoe may be made either flat at the bottom or provided with steel toe or heels, or with calks for traveling on ice, or in any other suitable manner, so long as its upper side next to the hoof is formed and shaped in the manner substantially as described.

Having thus described my improvement, what I claim as new, and desire to secure by Letters Patent, is—

A nailless horseshoe provided with lugs $a$, or their equivalents, formed on the upper side of the sole A, when used in connection with corresponding projections, $b$, formed on the inner side of the upper flange, B, the former being made to fit cavities formed in the horse's hoof, and the latter into grooves $c$, formed for their reception in the sole A, the whole being constructed and secured together in the manner and for the purposes substantially as set forth.

In testimony whereof I have hereunto set my hand to this specification.

JOHN MADDOCK.

Witnesses:
SIMON B. BROWN,
GEORGE F. BROWN.